United States Patent

[11] 3,565,368

[72] Inventor Melville Byron
13530 Woodcroft Ave., Edmonton, Alberta, Canada
[21] Appl. No. 837,616
[22] Filed June 30, 1969
[45] Patented Feb. 23, 1971

[54] SOLAR ENERGY BALLOON
1 Claim, 4 Drawing Figs.
[52] U.S. Cl. ................................................ 244/31; 46/89
[51] Int. Cl. ................................................ B64l 1/40
[50] Field of Search ................................... 244/31; 46/89

[56] References Cited
UNITED STATES PATENTS
3,153,878  10/1964  Smith, Jr. ................ 46/89
3,220,671  11/1965  Ashman et al. ........... 244/31
3,337,162   8/1967  Bauserman ............... 244/31

Primary Examiner—Milton Buchler
Assistant Examiner—Steven W. Weinrieb
Attorney—Rogers, Bereskin & Parr ABSTRACT: A balloon of thin plastic film with a transparent upper portion and an opaque light-reflecting lower portion. The lower portion is shaped to reflect sunlight, which enters the balloon through the transparent upper portion, towards a heat absorbent material supported within the balloon. The temperature of the heat absorbent material rises and tends to heat the surrounding entrapped air within the balloon.

PATENTED FEB23 1971

INVENTOR.
MELVILLE BYRON

BY
Rogers, Bereskin & Parr

INVENTOR.
MELVILLE BYRON

SOLAR ENERGY BALLOON

This invention relates to an improved solar energy balloon for use as a toy, advertisement carrier, distress signal, etc.

Balloons can be made buoyant by filling them with a suitable volume of a gas which is lighter than air, or by heating air inside the balloon. The balloon rises when the total weight of the balloon and its entrapped gas is less than the displaced weight of the external air.

Hot air balloons are commonly provided with a vent at or near the bottom of the balloon to allow the expanding air to escape, thereby maintaining a substantially constant volume within the balloon. Balloons of this type are normally filled with ambient air which is gradually heated. At the trapped air is heated, its specific gravity reduces until eventually there is sufficient lift to cause the balloon to ascend. The present invention is of this general kind, and it uses the sun as the source of energy for heating the air in the balloon.

According to the present invention, a balloon of thin plastic film is provided with a transparent upper portion and an opaque light-reflecting lower portion. The lower portion is shaped to reflect sunlight, which enters the balloon through the transparent upper portion, towards a heat absorbent material supported within the balloon. The temperature of the heat absorbent material rises and tends to heat the surrounding entrapped air within the balloon. After the balloon has been exposed to the sun's rays for a few minutes it will rise to a height where equilibrium exists between the weight of the balloon and entrapped air and the volume of the air displaced. In drawings which illustrate embodiments of the invention:

Figure 1:
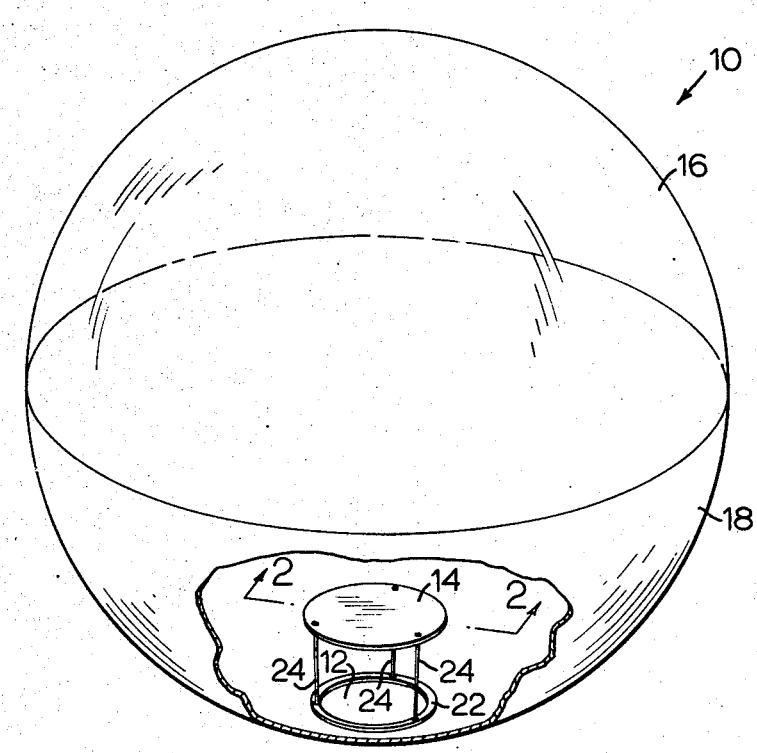
FIG. 1 is a schematic view of one form of a balloon according to the invention.

Reference is first made to FIGS. 1 an 2 which illustrate a balloon 10 having a vent or opening 13 for allowing equalization of internal and external pressures, and a radiant heat absorber 14 for changing radiant energy incident upon it into heat.

Figure 2:
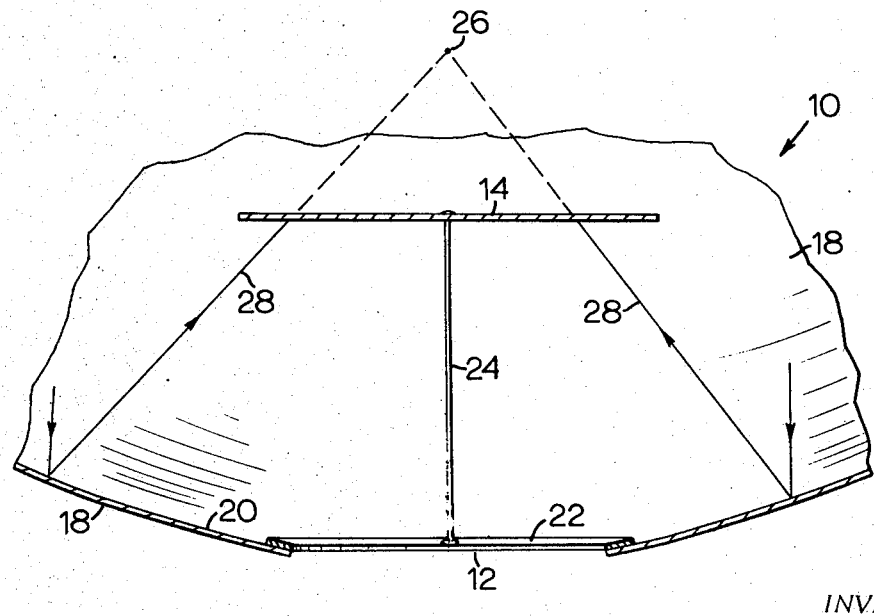
FIG. 2 is a partial sectioned view on line 2–2 of FIG. 1.

The balloon 10 comprises an upper generally hemispherical portion 16 of clear filmic material such as polyethylene film, for allowing radiant solar heat energy to enter the balloon 10, and a lower portion 18 that has a reflective inner surface. The lower portion 18 may be formed from any reflective filmic material such as polyethylene film with aluminum coating which is added by vacuum evaporation. Reference numeral 20 in FIG. 2 indicates a portion of the coating on the lower portion 18. When solar radiant heat energy impinges on the lower portion 18 it tends to come to a focus due to the shape of the lower portion 18 which may be spherical, elliptical, hyperbolic, or parabolic in shape. Typical rays 28 (FIG. 2) are shown as coming to a focus at 26 after being reflected from the lower portion 18.

The vent 12 is bounded by a light ring 22 which is fastened to the lower portion 18 about the vent 12. The ring 22 supports three slender legs 24 which are rigidly attached at their lower ends to the ring 22 and at their opposite ends to the radiant energy absorber 14.

The radiant energy absorber 14 is preferably made from thin metal foil coated on both sides with black paint, lamp black or other dark material. The absorber 14 is preferably supported between vent 12 and the focal point 26 (FIG. 2) at which the sun's rays 28 will tend to meet after they are reflected off the lower portion 18. In this position, the lower side of the absorber receives a large proportion of the reflected rays 28 before they can escape through the clear upper portion 16 of the balloon 10. The heat absorbed by the absorber 14 is released to the surrounding entrapped air in the balloon 10, and as the air in the balloon 10 heats up its specific gravity is reduced until ascend. lift is produced to cause the balloon 10 to ascend. The lift is equal to the difference in weight of the volume of ambient air displaced by the balloon 10 and the combined weight of the balloon structure and the heated entrapped air. The greater the lift, the greater the load the balloon 10 will support, or the more rapidly it will ascend The balloon is preferably formed of flexible, relatively nonelastic material, so that as the gas expands, the balloon is spread within its elastic limits to its full size. If the air in the balloon is heated further, air is expelled through the vent 12 to keep the volume of the balloon substantially constant.

The balloon 10 is preferably formed from relatively strong polyethylene film having a thickness of less than one mil. (0.001 inch). A suitable sheet has a thickness of 0.75 mil. The diameter of the balloon depends upon the total lift required, and the differential air temperature between the ambient air and the air inside the balloon. A six foot diameter balloon, for example, can lift its own weight of about 0.5 pound.

To fly the balloon the vent 12 is positioned so that the wind fills the balloon, or else the balloon is moved quickly to scoop air into it through the vent 12. The balloon is then held towards the sun with the hand cupping the vent 22 to trap as much solar radiant heat as possible and to divert the heat by reflection off the reflective lower portion 18 onto the heat absorber 14. After a brief period the balloon will become buoyant and it will tend to lift off. A light upward thrust will assist the balloon to begin its ascent. A fine nylon thread or the like can be attached to the ring 22 to permit retrieval of the balloon.

Figure 3:
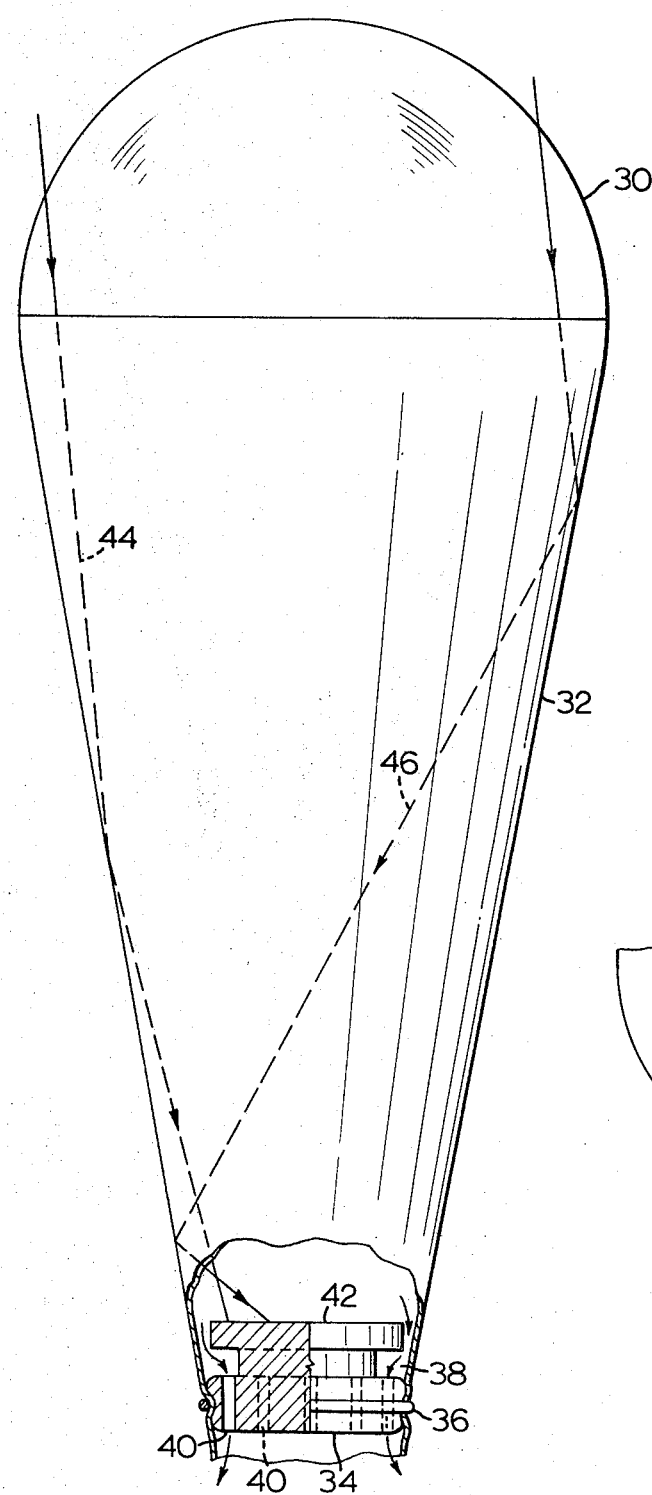
FIG. 3 is a partially sectioned front view of another embodiment of the invention.

Reference is now made to FIG. 3 which illustrates another embodiment of the balloon. In this embodiment the balloon is made from the same materials as used for the balloon of FIG. 1 and consists of a generally spherical transparent upper portion 30 and an opaque, generally conical lower portion 32. The lower portion 32 is reflective on its inner surface for directing radiant heat downwardly towards a cylindrical member 34 attached to the lower portion 32.

The bottom of the lower portion 32 terminates in an opening in which the cylindrical member 34 is positioned. The cylindrical member 34 may be held in place by an elastic band 36 or other suitable means.

The cylindrical member 34 is symmetrical, and it includes an annular recess 38 near its upper surface and has a plurality of apertures 40 linking the recess 38 to its bottom surface for allowing air to pass between the inside of the balloon and the atmosphere. The cylindrical member 34 has an upper surface 42 which is coated with a heat absorbing material such as lamp black so that when solar rays such as 44 and 46 enter the balloon, they are reflected by the reflective lower portion 32 onto the heat absorbing surface 42 where most of them are absorbed. The surface 42 gives off its absorbed heat to the air in the balloon, and the operation of the balloon is identical to that described above with reference to FIG. 1. The cylindrical member 34 must be light and is preferably made from foamed plastic material.

Figure 4:
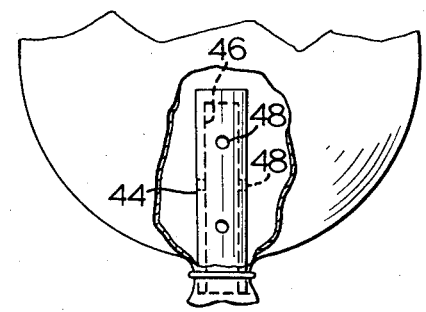
Fig. 4 is a partially sectioned view of a portion of another embodiment of the invention.

Reference is now made to FIG. 4 which shows an alternative form of heat absorber suitable for use with the balloons shown in FIGS. 1 and 3. In FIG. 4, the heat absorber is in the form of a cylindrical sleeve 44 having an open lower end and a closed upper end. A plurality of apertures 48 are formed in the sleeve 44 to allow equalization of internal and external air pressures. The sleeve 44 is also preferably made from a foamed plastic material with a matt black coating applied to it. The coating may be lamp black or other dark material.

Although the shape of the balloon is to a considerable extent a matter of choice, best results are obtained with a stable balloon, i.e. a balloon which has a center of buoyancy well above its center of gravity to ensure that the balloon will not roll over. The balloons described have structures which are designed to be "bottom heavy" thereby ensuring a high degree of stability.

I claim:

1. An air balloon of thin filmic material being generally concentric about a vertical axis when filled with air and comprising:

a. a transparent and generally hemispherical upper portion;

b. an opaque and generally conical lower portion having a vertical extent greater than the radius of curvature of the upper portion and tapering downwardly and inwarding from the upper portion to define an opening at the bottom of the lower portion, said lower portion having a reflective inner surface for receiving solar radiant heat which passes through the upper portion and for reflecting said heat towards a predetermined area in the balloon, said area being adjacent and above the said opening and on the vertical axis of the balloon;

c. a combination radiant heat absorber and vent structure, said structure being located in said opening such that the heat absorber is positioned in said predetermined area and said vent provides a passage for air from within the balloon to outside the balloon; and d. means releasably attaching said structure to the lower portion with a lower part of the lower portion in relatively tight engagement about the structure, the air in the balloon being heated by radiant heat which passes through the upper portion and is reflected by the lower portion onto the heat absorber whereby the air in the balloon is heated and expanded so reducing the specific gravity of the air, the vent permitting a portion of the expanded air to escape thereby maintaining the volume of air in the balloon substantially constant while the specific gravity of the air decreases, thus resulting in a lift force which raises the balloon until a height is reached at which the lift force is balanced by the weight of the balloon and the entrapped air.